United States Patent [19]

Garbutt

[11] 4,344,971

[45] Aug. 17, 1982

[54] PRESERVATION OF FRUITS AND VEGETABLES

[75] Inventor: John T. Garbutt, Muscatine, Iowa

[73] Assignee: Grain Processing Corporation, Muscatine, Iowa

[21] Appl. No.: 249,727

[22] Filed: Mar. 31, 1981

Related U.S. Application Data

[63] Continuation-in-part of Ser. No. 195,525, Oct. 9, 1980, abandoned.

[51] Int. Cl.$^3$ .............................................. A23L 1/212
[52] U.S. Cl. .................................... 426/102; 426/310; 426/333; 426/615; 426/654
[58] Field of Search ............... 426/310, 321, 331, 333, 426/615, 654, 102; 260/112 R

[56] References Cited

U.S. PATENT DOCUMENTS

| | | |
|---|---|---|
| 3,556,814 | 1/1971 | Whitman et al. .................... 426/310 |
| 3,652,300 | 3/1972 | Sharma ................................. 426/654 |
| 4,006,259 | 2/1977 | Kalmar ................................. 426/310 |
| 4,058,510 | 11/1977 | Concilio-Nolan et al. ..... 260/112 R |
| 4,140,649 | 2/1979 | Bassert et al. ....................... 426/310 |

FOREIGN PATENT DOCUMENTS 2057355  5/1971  France .

OTHER PUBLICATIONS

Chemical Abstracts 67:2282a, "Fruit Preservation and Protection Process," Sep. 23, 1966.
Chemical Abstracts 75:19016e, "Composition for Preserving Fruits and Vegetables," Nov. 13, 1970.
Chemical Abstracts 86:70421n, "Improvement in Storability of Fruit," Kochman et al., Jun. 12, 1976.
Chemical Abstracts 89:74467s, "Treatment of Fruit and Vegetables," Tan et al.
Science News, "Second Skin for Commercial Fruit", vol. 118, p. 72, (1980).

Primary Examiner—Raymond N. Jones
Assistant Examiner—George C. Yeung
Attorney, Agent, or Firm—Neuman, Williams, Anderson & Olson

[57] ABSTRACT

Preservation of fruits and vegetables with a protein precipitate obtained by treating a protein-containing liquid with an anionic surface active agent containing not less than 8 carbon atoms.

26 Claims, No Drawings

PRESERVATION OF FRUITS AND VEGETABLES

This application is a continuation-in-part of Ser. No. 195,525 filed Oct. 9, 1980, now abandoned.

This invention relates to the preservation of fruits and vegetables.

Loss of weight in fresh fruits and vegetables due to moisture evaporation is an economic problem for both producers and retailers. In addition, the relatively short shelf life of more perishable foods, particularly fruits such as bananas, pears, grapes, pineapples, apricots, avocados, peaches, plums, melons, citrus fruits, berries, tomatoes, peppers and the like, causes economic loss due to spoilage.

Some fruits and vegetables can be somewhat protected from moisture loss and spoilage by the application thereto of wax films. However, this expedient has limited effectiveness and is sometimes objectionable from the consumer standpoint. Too, the application of wax films often adversely affects color and flavor of foods such as bananas.

It is therefore a major object of this invention to provide a new method for preserving fruits and vegetables without adversely affecting color or flavor thereof.

Another object of the invention is to provide a method for extending the shelf life of perishable fruits and vegetables.

A still further object of the invention is to provide a method for reducing moisture loss from perishable fruits and vegetables after harvest.

These and other objects are accomplished in accordance with this invention by treating fruits and vegetables with a protein precipitate. The protein precipitate is obtained by treating a protein-containing liquid with an anionic surface active agent to cause precipitation of protein. An aqueous solution of this protein precipitate is applied to fruits and vegetables such as by spraying or dipping the fruits and vegetables therein to preserve them. Fruits and vegetables treated with the protein exhibit reduced moisture loss and prolonged shelf life with normal development of color and flavor.

The protein-containing liquid from which the protein precipitate is obtained is preferably an aqueous extract of a protein source material such as corn steep liquor, soy whey, cheese whey, corn gluten filtrate, wheat steep liquor, brewer's wort and the like. Precipitation of protein from the protein-containing liquid is achieved by adding to said liquid an anionic surface active agent containing not less than 8 carbon atoms. Generally, the anionic precipitant is used in amounts ranging from about 1 to 4 grams per liter of the protein-containing liquid. Examples of anionic precipitants are alkyl aryl sulfonates, in particular alkylbenzene sulfonates in which the alkyl group contains from 8 to 20 carbon atoms, e.g. dodecylbenzene sulfonate, octadecylbenzene sulfonate, higher aliphatic sulfates and sulfonates in which the aliphatic radical comprises from 8 to 20 carbon atoms, such as lauryl sulfate, heptadecyl sulfate, lauryl sulfonate; and higher fatty acid amides in which the acyl group contains from 8 to 20 carbon atoms, such as tallow fatty acid amide, cocoa fatty acid amide and the like. The sulfonates and sulfates referred to above are commonly used in the form of alkali metal sulfonates, in particular sodium sulfonates and sodium sulfates, although the corresponding salts of ammonium or organic bases, such as, e.g. ethanol amine, triethanol amine and the like may also be used.

In a presently preferred but optional embodiment, a plasticizer is incorporated in the aqueous solution of the protein precipitate which is utilized to preserve fruits and vegetables. The plasticizer employed is preferably a di- or polyhydroxyalkane, such as ethylene glycol, propylene glycol, glycerol, polyglycerol and other related di- or polyhydroxy compounds. Plasticizers, such as dimethylsulfoxide and ethanolamine, can likewise be employed.

As is known, corn steep liquor which is the aqueous extract obtained when corn is soaked in water containing sulfur dioxide, is a by-product of the corn wet milling industry and contains about 45–50% (dry basis) soluble protein measured as Kjeldahl nitrogen.

According to one specific preferred embodiment of the invention, an aqueous extract of corn (corn steep liquor) containing about 7 to 10 grams per liter of a filter aid material is treated with an anionic precipitant such as sodium lauryl sulfate. The pH of the corn steep liquor is maintained preferably between pH 2 and pH 6 and most preferably between pH 3.2 and pH 3.6. The sodium lauryl sulfate is used in amounts of from about 1.0 to 4.0 grams per liter of corn steep liquor. The resulting precipitate is recovered by filtration or centrifugation, washed with water (pH 4) and redissolved in dilute sodium hydroxide at a pH from about 7.0 to 10.0 and preferably between pH 7.5 to 8.5. Other alkali or alkaline salts such as ammonium hydroxide, calcium hydroxide, sodium carbonate and the like can be used in lieu of the sodium hydroxide. The protein content (Kjeldahl nitrogen X 6.25) of the solution after removal of the filter aid is preferably high, such as above about 80%, dry basis, and depends upon the level of sodium lauryl sulfate employed and the effectiveness of the washing of the precipitate. The protein precipitate can be recovered in dry form by known freeze drying or spray drying techniques.

For the preservation of fruits and vegetables in accordance with the invention, a 1 to 10% by weight, preferably 3 to 4% by weight, solution of the protein precipitate dissolved in water is utilized. The pH of this preserving solution is preferably maintained at about 7.5 to about 8.0. The preserving solution is applied to the fruits or vegetables such as by spraying or by dipping the fruits or vegetables into the solution for a few seconds and allowing the treated fruits or vegetables to air dry at room temperature. Although the amount of the protein preservative required per ton of fruit or vegetable varies with the size of the food item, texture of its surface and so forth, the generally effective range is between 0.1 and about 1.0 pound of protein product per ton of the fruit or vegetable. By treating fruits and vegetables with the preservative in accordance with this invention, the weight loss of the treated food is significantly reduced and shelf life is extended without adverse effect on the texture, appearance or flavor of the treated food.

The advantages of the invention will be further apparent from the following examples.

EXAMPLE 1

Green bananas were divided into four groups of four bananas in each group. Three of the groups were dipped in 3, 5 and 7% by weight aqueous solutions of protein precipitate resulting from treating corn steep liquor with sodium lauryl sulfate. The precipitate contained 82.3% protein on dry basis. The pH of the aqueous protein solution used to treat the bananas was 7.9. After dipping the bananas into the preserving solution, the bananas were allowed to dry in air and weighed. The amount of protein applied to the bananas was determined using the formula below:

$$\text{Pounds/Ton} = \frac{\text{Weight of Solution (wt. before} - \text{wt. after dipping)} \times \text{\% Solids} \times 2000}{\text{Weight Bananas} \times 100}$$

After treatment, the bananas were allowed to stand at room temperature for five days during which time weight loss and color development were observed. These results are shown in Table I.

As the results show, the treated bananas lost weight and developed color at a slower rate than the control bananas.

TABLE I

| Day | Protein Level, pounds/ton | | | |
|---|---|---|---|---|
| | 0 | 0.3 | 0.47 | 0.73 |
| | % weight loss | | | |
| 2 | 3.03 | 2.49 | 2.50 | 2.79 |
| 3 | 4.47 | 3.79 | 3.98 | 4.03 |
| 4 | 7.76 | 5.90 | 6.67 | 6.49 |
| 5 | 11.56 | 8.94 | 9.58 | 9.20 |
| Weight loss as % of control (5 days) | 100 | 77 | 83 | 80 |

Color

The control group was more yellow and had more black spots than any of the treated bananas.

EXAMPLE 2

Green bananas were given a water wash and divided into three equivalent groups of four bananas each. Two groups were dipped into 3 and 10% by weight aqueous solutions of protein precipitated from corn steep liquor by sodium lauryl sulfate. The precipitate contained 79% protein on dry basis. The aqueous protein solution used to treat the fruit had a pH of 8. The untreated group was employed as a control. Each group was weighed daily and weight loss determined. Observations of color change were made and scored on a basis of 1 to 8 as explained below:
1—green
2—light green
3—yellow-green
4—yellow
5—yellow with small dark spots
6—yellow with many dark spots
7—yellow with large dark spots
8—mostly dark The results are given in Table II below:

TABLE II

| Day | Protein Level (pounds/ton) | | | | | |
|---|---|---|---|---|---|---|
| | 0 | 0.3 | 1.0 | 0 | 0.3 | 1.0 |
| | Color Score | | | % Weight Loss | | |
| 1 | 4 | 4 | 4 | 1.47 | 1.39 | 1.34 |
| 2 | 5 | 4 | 4 | 2.39 | 2.11 | 2.06 |
| 3 | 5+ | 4 | 4 | 3.89 | 3.03 | 3.20 |
| 4 | 6 | 4 | 4 | 7.66 | 5.91 | 6.63 |
| 5 | 7 | 5 | 5 | 8.92 | 6.97 | 7.70 |
| 6 | 7 | 5 | 5 | 11.16 | 8.47 | 8.76 |

After six days the following measurements were made.

| | Protein Level (pounds/ton) | | |
|---|---|---|---|
| | 0 | 0.3 | 1.0 |
| Banana Pulp, % Dry Solids | 18.07 | 17.59 | 16.66 |
| Flavor | Normal | Normal | Normal |
| Texture | Firm | Firm | Slightly soft |
| DE* | 70.8 | 68.4 | 65.0 |

*DE = grams of reducing sugar expressed as dextrose per 100 grams of solids.

Moisture loss in the protein-treated bananas was between 76 to 78% of the control group. Color development was about two days behind that of the controls. Flavor and texture were normal in all cases.

EXAMPLE 3

The same procedure as described in Examples 1 and 2 was employed except lower levels of the protein were used, the protein levels being 0.1, 0.2 and 0.3 pounds per ton. The results are shown in Table III. In this test the weight loss of the treated bananas at 0.2 and 0.3 pounds protein per ton was approximately 90% of the control bananas. Color development in the treated bananas was about two days behind that of the controls. Flavor appeared normal in all groups after six days but texture of the control bananas and the bananas treated at the 0.1 pound per ton level was softer than the bananas treated at 0.2 and 0.3 pound per ton levels.

TABLE III

| Day | Protein Level (pounds/ton) | | | | | | |
|---|---|---|---|---|---|---|---|
| | 0 | 0.1 | 0.2 | 0.3 | 0 | 0.1 | 0.2 | 0.3 |
| | Color Score | | | | % Weight Loss | | | |
| 1 | 2 | 2— | 2— | 2— | 1.31 | 1.84 | 1.65 | 1.51 |
| 2 | 3 | 2 | 2 | 2 | 3.47 | 3.67 | 3.45 | 3.42 |
| 3 | 4 | 3 | 3 | 3 | 5.97 | 6.06 | 5.65 | 5.81 |
| 4 | 6 | 6 | 3 | 3 | 7.67 | 7.79 | 7.20 | 7.48 |
| 5 | 6 | 6 | 4 | 4 | 9.13 | 8.90 | 8.21 | 8.36 |
| 6 | 7 | 7 | 5 | 5 | 10.86 | 10.46 | 9.65 | 9.85 |

After six days the following determinations were made:

| | 0 | 0.1 | 0.2 | 0.3 |
|---|---|---|---|---|
| Flavor | Normal | Normal | Normal | Normal |
| Texture | | | | |
| 6 Days | Soft | Soft | Firm | Firm |
| 9 Days | Very soft | Very soft | Firm | Firm |

EXAMPLE 4

Pears, grapes and pineapples were dipped in a 4% by weight aqueous solution of protein having a pH of 7.8. Corresponding untreated fruit were used as controls. The samples were allowed to stand at room temperature and the weight loss determined daily. The results of these tests are shown in Table IV.

TABLE IV

| | Protein Level, pounds/ton | | | | | |
|---|---|---|---|---|---|---|
| | Pears | | Grapes | | Pineapple | |
| Day | 0 | 0.6 | 0 | 0.8 | 0 | 3.3 |
| | % Weight Loss | | | | | |
| 1 | 0.90 | 0.85 | 1.80 | 1.65 | 2.07 | 1.93 |
| 2 | 1.76 | 1.67 | 3.41 | 3.10 | 3.96 | 3.68 |
| 4 | 3.46 | 3.17 | 5.79 | 5.21 | 6.86 | 6.43 |
| 5 | 4.05 | 3.71 | 6.89 | 6.18 | 8.63 | 7.84 |
| 6 | 4.99 | 4.54 | 8.03 | 7.21 | 10.10 | 9.06 |

After six days the following determinations were made:

| Flavor | Normal | Unripe | Normal | Normal | Slightly tart | Sweet |
|---|---|---|---|---|---|---|
| Color | Yellow | Green-yellow | Normal | Normal | Normal | Normal |
| Texture | Soft | Firm | Normal | Normal | Firm | Firm to slightly soft |

EXAMPLE 5

An aqueous extract of corn (corn steep liquor) containing about 7–10 grams per liter of a filter aid material is treated with sodium heptadecyl sulfate. The pH of the corn steep liquor is maintained preferably between 3 and 3.6 and the sodium heptadecyl sulfate is used in an amount of approximately 1.5 grams (dry basis) per liter of corn steep liquor. The resulting precipitate is recovered by filtration or centrifugation, washed with water and redissolved in dilute sodium hydroxide at a pH from about 7.0 to 10.0 and preferably between 7.5 and 8.5. The product obtained contains about 80.4% protein (dry basis) and the solids recovery is about 6.2% based on the original solids in the corn steep liquor. The protein is completely soluble in water above pH 7.5 and forms a clear, tough film on glass.

EXAMPLE 6

One liter of cheese whey containing 10 grams of filter aid (Celite 505) maintained at a pH of 4.7 is treated with 2 grams of sodium lauryl sulfate. The resulting precipitate is recovered by filtration or centrifugation, washed with water and redissolved in dilute sodium hydroxide at a pH preferably between 7.5 and 8.5. The protein content (Kjeldahl nitrogen×6.25) of the solution is about 65.4% protein (dry basis) and the solids recovery is about 10.1% based on original cheese whey solids.

EXAMPLE 7

Forty grams of spray dried concentrate obtained from the ultrafiltration of soy whey is slurried in 800 milliliters of water and filtered to remove haze. Five hundred milliliters of the clear filtrate is adjusted to pH 3.8, five grams of filter aid (Celite 505) added and one gram of sodium lauryl sulfate added. The slurry is filtered, washed with water and redissolved in dilute sodium hydroxide at a pH between 7.5 and 8.5. The protein content of the solution is about 68.3% protein (dry basis) and the solids recovery is about 11.7% based on original spray dried concentrate. This material exhibits excellent film properties when spread on glass plates.

EXAMPLE 8

Gluten filtrate obtained from the filtration of the corn gluten fraction in the wet milling processing of corn is maintained at a pH of 4 and treated with 10 grams/liter of Celite 505. To the slurry is added sodium lauryl sulfate (2 grams per liter). The resulting precipitate is recovered by filtration or centrifugation, washed with water and redissolved in dilute sodium hydroxide at a pH between 7.5 and 8.5. The protein content (Kjeldahl nigrogen×6.25) of the solution is about 73.1% (dry basis) and the solids recovery is about 7.7% based on original gluten filtrate solids. This material exhibits excellent film properties when spread on glass plates.

EXAMPLE 9

Protein precipitates were obtained by adding to corn steep liquor, in one case, sodium lauryl sulfate, and in another case, by adding sodium heptadecyl sulfate. The precipitates were recovered and redissolved in an aqueous alkaline solution.

To 10 milliliter aliquots of the aqueous protein solutions were added varying amounts of glycerol. The aqueous solution of the sodium lauryl sulfate precipitate contained 4.4% solids and had a pH of 8.0, while the aqueous solution of the sodium heptadecyl sulfate precipitate contained 4.8% solids and had a pH of 8.4. The 10 milliliter aliquots were placed in aluminum pans and dried at 100° C. The results of observing the resulting films are shown in Table V below:

TABLE V

| Glycerol (% Protein Precipitate, Dry Basis) | Film Observations |
|---|---|
| Sodium lauryl Sulfate precipitate* | |
| 0 | Light green, hazy, many cracks |
| 6 | Tan-green, hazy, fewer cracks |
| 11 | Tan-green, hazy, fewer cracks |
| 17 | Tan-green, clear, few cracks |
| 23 | Tan-green, clear, no cracks |
| 29 | Tan-green, clear, no cracks |
| 34 | Brown, clear, no cracks |
| Sodium heptadecyl sulfate precipitate** | |
| 0 | Light tan, clear, many cracks |
| 5 | Light tan, clear, fewer cracks |
| 10 | Light tan, clear, fewer cracks |
| 16 | Light tan, clear, few cracks |
| 21 | Light tan, clear, few cracks |
| 26 | Light tan, clear, few cracks |
| 31 | Light tan, clear, no cracks |

*All solutions containing glycerol turned turbid after standing overnight at room temperature.
**All solutions still clear to slightly hazy on standing overnight.

Similar results were obtained by the use of ethylene glycol, polyethylene glycol, erythritol, sorbitol, propylene glycol, ethanolamine and dimethylsulfoxide in place of glycerol. The glycol materials apparently act as a plasticizer to improve film properties.

EXAMPLE 10

Bananas in a green condition were divided into six groups of six bananas each. The bananas were then dipped into aqueous solutions of protein precipitates, air dried and stored at room temperature. Weight loss and color changes were recorded daily for seven days, after which texture and flavor were noted. In these tests "Capsul," a modified waxy maize starch product manufactured by National Starch Company was also tested with preserving agents of the invention. The results are shown in Table VI:

TABLE VI

| Group Description | 1 Control | 2 Solution A* | 3 Solution B* | 4 Capsul | 5 Solution C* | 6 Solution D* |
|---|---|---|---|---|---|---|
| Solution Solids, % w/v | 0 | 4.09 | 4.23 | 25.4 | 4.00 | 4.87 |
| pH | | 8.4 | 8.4 | 6 | 7.8 | 7.8 |
| Pounds of Protein/Ton of Bananas | 0 | 0.32 | 0.33 | 8.14 | 0.42 | 0.38 |

TABLE VI-continued

| Group Description | 1 Control | 2 Solution A* | 3 Solution B* | 4 Capsul | 5 Solution C* | 6 Solution D* |
|---|---|---|---|---|---|---|
| Days | | | Weight Loss, % | | | |
| 1 | 1.52 | 1.52 | 1.42 | 1.98 | 1.62 | 1.55 |
| 2 | 3.36 | 3.21 | 2.19 | 4.11 | 3.32 | 3.11 |
| 3 | 4.78 | 4.57 | 4.25 | 5.94 | 4.79 | 4.35 |
| 4 | 6.72 | 6.26 | 5.66 | 7.99 | 6.41 | 5.91 |
| 5 | 8.44 | 7.78 | 7.08 | 9.97 | 7.96 | 7.27 |
| 6 | 9.63 | 8.91 | 8.05 | 11.42 | 9.04 | 8.24 |
| 7 | 11.05 | 10.11 | 9.17 | 13.24 | 10.27 | 9.41 |
| | | | Color | | | |
| 0 | 2 | 2 | 2 | 2 | 2 | 2 |
| 1 | 3 | 2+ | 2+ | 3 | 2+ | 3 |
| 2 | 4 | 3 | 3 | 3 | 2+ | 3 |
| 3 | 5 | 4 | 3+ | 4 | 3 | 3+ |
| 4 | 6 | 4+ | 4 | 4 | 4 | 4 |
| 5 | 6+ | 5 | 5 | 4 | 4+ | 4+ |
| 6 | 7 | 5+ | 5 | 4+ | 4+ | 4+ |
| 7 | 7+ | 6 | 5 | 6+ | 5 | 5 |
| Texture (7 days) | Soft | Firm | Firm | Soft | Firm | Firm |
| Flavor (7 days) | Normal (Slightly overripe) | Normal | Normal | Different | Normal | Normal |

*Solution A - Protein precipitated from cheese whey with sodium lauryl sulfate.
*Solution B - Protein precipitated from corn steep liquor with sodium heptadecyl sulfate.
*Solution C - Protein precipitated from corn steep liquor with sodium lauryl sulfate.
*Solution D - Protein precipitated from corn steep liquor with sodium lauryl sulfate and containing glycerol.

EXAMPLE 11

Corn steep liquor was treated with sodium lauryl sulfate and a precipitate recovered therefrom. A preserving solution was obtained by dissolving the precipitate in water at pH 7.8 and at a solids level of 3.6%. Twelve tomatoes and seven peppers were dipped into the preserving solution and air dried and permitted to stand at room temperature (23° C.) for six days. Observations and weight loss data are shown below:

TABLE VII

| | Tomatoes | | Peppers | |
|---|---|---|---|---|
| | Control | Treated | Control | Treated |
| Lbs. Protein Precipitate/Ton of Vegetable | 0 | 0.33 | 0 | 0.67 |
| Days | | Weight Loss, % | | |
| 1 | 0.54 | 0.60 | 2.92 Wrinkled Appearance | 2.74 Smooth |
| 2 | 1.19 | 1.37 | 7.31 Wrinkled | 6.60 Less Wrinkled |
| 3 | 1.68 | 1.91 | 10.61 | 9.56 |
| 4 | 2.22 | 2.46 | 14.48 | 12.95 |
| 6 | 3.09 | 3.39 | 18.33 All Peppers Wrinkled | 16.77 Two Still Smooth |

EXAMPLE 12

Corn steep liquor was treated with sodium lauryl sulfate and a precipitate removed therefrom. A preserving solution was prepared by dissolving the precipitate in water at a pH of 7.8 and at a solids level of 3.6%.

A comparative solution was prepared by dissolving zein in 90% isopropanol at a solids level of 3.6%.

Twelve bananas were dipped into each solution, air dried and allowed to stand at 23° C. for seven days. Observations and weight loss data are shown below:

TABLE VIII

| | Control | Zein | SLS Corn Protein |
|---|---|---|---|
| Pounds of Protein Preserving Precipitate/Ton | 0 | 0.51 | 0.32 |
| Days | | Weight Loss, % | |
| 1 | 1.48 | 1.58 | 1.48 |
| 2 | 3.31 | 3.37 | 3.15 |
| 3 | 4.38 | 4.49 | 4.22 |
| 5 | 6.87 | 6.94 | 6.51 |
| | Many small, dark spots | Fewer spots than control | Had fewest spots |
| 6 | 8.40 | 8.37 | 7.91 |
| 7 | 9.77 | 9.60 | 9.01 |
| | Dark | Less Dark | Best Looking |

EXAMPLE 13

Corn steep liquor was processed with twelve different anionic surfactants in the same manner as previously described for sodium lauryl sulfate. Solids recovery, protein content and film forming properties of the resulting products from each surfactant are recorded in the attached Table IX. Of the twelve surfactants examined, the following six gave the best results.

| | |
|---|---|
| WA Specials | Sodium lauryl sulfate |
| Niaproof 4 | Sodium tetradecyl sulfate |
| Niaproof 7 | Sodium heptadecyl sulfate |
| Avirol 110 | Sodium n-decyl sulfate |
| Petrowet R | Sodium alkyl sulfonate |
| Calsolene Oil HSA | Sulfated fatty acid ester |

TABLE IX

Treatment of of Corn Steep Liquor with Anionic Surfactants

| Trade Name | Manufacturer | Type | Conc. % | Level Used[a] ml/200 ml | Solids Recovery[b] % | Protein % DB | Film Properties On Glass[c] | Drying @100° C.[d] | |
|---|---|---|---|---|---|---|---|---|---|
| WA Specials | Stepan Chemical Co. | Sodium lauryl sulfate | 29 | 1.4 | 6.6 | 66.2 | Good | Good | R = 12 carbon, R—SO$_4$Na |
| Niaproof 4 | Niacet Corp. | Sodium tetradecyl sulfate | 27 | 1.5 | 6.4 | 67.2 | Good | Good | R = 14 carbon, R—SO$_4$Na |
| Niaproof 7 | Niacet Corp. | Sodium heptadecyl sulfate | 26 | 1.6 | 4.1 | 54.6 | Good | Good | R = 17 carbon, R—SO$_4$Na |
| Niaproof 08 | Niacet Corp. | 2-ethylhexyl sulfate | 39 | 1.1 | 3.0 | 50.0 | Good | Good | R = 8 carbon, R—SO$_4$—Na |
| Avirol 110 | Henkel Corp. | Sodium n-decyl sulfate | 30 | 1.4 | 5.8 | 68.2 | Good | Fair | R = 10 carbon, R—SO$_4$—Na |
| Petrowet R | E.I. Du Pont de Nemours | Sodium alkyl sulfonate | 22 | 1.9 | 4.3 | 55.3 | Good | Fair | R—SO$_3$—Na |
| Conco Sulfate C | Continental Chemical Co. | Sodium cetyl stearyl sulfate | 30 | 1.4 | 11.2 | 14.4 | Good | Fair | R—SO$_4$—Na |
| Clindrol 206 CGN | Clintwood Chemical Co. | Coco alkanolamide | 100 | 0.4 | 3.8 | 46.8 | Good | Fair | $R_1$—C(=O)—NR |
| Conoco C550 | Conoco Chemical Co. | Sodium alkylbenzene sulfonate | 52 | 0.8 | 4.5 | 44.17 | Good | Good | R—C$_6$H$_4$—SO$_3$Na |
| Carboxane TW-100 | Henkel Corp. | Alcohol ethoxylate | 100 | 0.4 | 2.8 | 43.01 | Good | Fair | Reaction of alcohol with ethylene oxide |
| Calsolene Oil HSA | ICI | Sulfated fatty acid ester | 45 | 0.9 | 4.5 | 67.42 | Good, hazy | Fair-good | R—C(=O)—C—C(=O)—OR, SO$_4$Na |
| Conco Sulfate 219 | Continental Chemical Co. | Sodium lauryl ether sulfate | | | 4.5 | 53.0 | Good, hazy | Good | R—O—C—C—S(=O)$_2$—O.Na |
| Corn Steep Liquor | | | | | | 46.1 | | No film | |

[a] Quantity equivalent to 0.41 g of active ingredient.
[b] Based on dry solids in 200 ml of filtered corn steep liquor.
[c] 0.1–0.2 ml of 3–5% solution spread on 8" × 8" glass plate with 0.001" Bird applicator.
[d] Ten ml of 3–5% solution dried down at 100° C. in 2" aluminum pan.

The advantages of the invention to fruit and vegetable producers, shippers and consumers is readily apparent.

Those modifications and equivalents which fall within the spirit of the invention are to be considered a part thereof.

What is claimed is:

1. A process for preserving fruit and vegetables which comprises treating a fruit or vegetable with an amount of protein obtained by treating a protein-containing liquid with an anionic surface active agent containing not less than 8 carbon atoms to precipitate protein therefrom, said amount of protein being sufficient to reduce the moisture loss and to extend the shelf life of said fruit or vegetable.

2. A process in accordance with claim 1 wherein the fruit or vegetable is treated with an aqueous solution of said protein.

3. A process in accordance with claim 2 wherein the aqueous solution utilized to treat the fruit or vegetable contains a plasticizing agent.

4. A process in accordance with claim 3 wherein the plasticizing agent is a dihydroxyalkane or polyhydroxyalkane.

5. A process in accordance with claim 1 wherein treatment of the fruit or vegetable is effected by dipping the fruit or vegetable in an aqueous solution of the said protein.

6. A process in accordance with claim 1 wherein treatment of the fruit or vegetable is effected by spraying the fruit or vegetable with an aqueous solution of said protein.

7. A process in accordance with claim 1 wherein the protein-containing liquid is corn steep liquor.

8. A process in accordance with claim 1 wherein the protein-containing liquid is corn steep liquor and the anionic surface active agent is sodium lauryl sulfate.

9. A process in accordance with claim 1 wherein the protein-containing liquid is corn steep liquor and the anionic surface active agent is sodium heptadecyl sulfate.

10. A process in accordance with claim 1 wherein the protein-containing liquid is cheese whey.

11. A process in accordance with claim 1 wherein the protein-containing liquid is soy whey.

12. A process in accordance with claim 1 wherein the protein-containing liquid is corn gluten filtrate.

13. A process in accordance with claim 1 wherein the protein-containing liquid is wheat steep liquor.

14. A process in accordance with claim 1 wherein the protein-containing liquid is brewer's wort.

15. A process in accordance with claim 2 wherein the protein-containing liquid is corn steep liquor, the anionic surface active agent is sodium lauryl sulfate and the aqueous solution of said protein contains a dihydroxyalkane or polyhydroxyalkane.

16. A fruit or vegetable having thereon a preserving coating of a protein obtained by treating a protein-containing liquid with an anionic surface active agent containing not less than 8 carbon atoms to precipitate protein therefrom, said coating being effective to reduce the moisture loss and to extend the shelf life of said fruit or vegetable.

17. A fruit or vegetable in accordance with claim 16 wherein the preserving coating contains a plasticizing agent.

18. A fruit or vegetable in accordance with claim 17 wherein the plasticizing agent is a dihydroxyalkane or polyhydroxyalkane plasticizing agent.

19. A fruit or vegetable in accordance with claim 16 wherein the protein-containing liquid utilized to obtain the protein is corn steep liquor.

20. A fruit or vegetable in accordance with claim 19 wherein the anionic surface active agent utilized is sodium lauryl sulfate.

21. A fruit or vegetable in accordance with claim 19 wherein the anionic surface active agent utilized is sodium heptadecyl sulfate.

22. A fruit or vegetable in accordance with claim 16 wherein the protein-containing liquid is cheese whey.

23. A fruit or vegetable in accordance with claim 16 wherein the protein-containing liquid is soy whey.

24. A fruit or vegetable in accordance with claim 16 wherein the protein-containing liquid is corn gluten filtrate.

25. A fruit or vegetable in accordance with claim 16 wherein the protein-containing liquid is wheat steep liquor.

26. A fruit or vegetable in accordance with claim 16 wherein the protein-containing liquid is brewer's wort.

* * * * *